(12) United States Patent
Kraft et al.

(10) Patent No.: US 7,904,963 B2
(45) Date of Patent: Mar. 8, 2011

(54) GENERATING CODE TO VALIDATE INPUT DATA

(75) Inventors: Tara Kraft, Seattle, WA (US); Matthew D. Wood, Seattle, WA (US); Benjamen E. Ross, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1038 days.

(21) Appl. No.: 11/527,004

(22) Filed: Sep. 26, 2006

(65) Prior Publication Data

US 2008/0126869 A1  May 29, 2008

(51) Int. Cl.
  *G06F 11/00* (2006.01)
  *G06F 7/00* (2006.01)
(52) U.S. Cl. ............... 726/25; 714/37; 707/687
(58) Field of Classification Search .......... 726/22, 726/25; 714/37–39; 707/687
  See application file for complete search history.

(56) References Cited

U.S. PATENT DOCUMENTS

| | | | |
|---|---|---|---|
| 5,557,732 A | 9/1996 | Thompson | 715/705 |
| 5,809,138 A | 9/1998 | Netiv | 726/23 |
| 5,889,992 A * | 3/1999 | Koerber | 717/108 |
| 5,956,481 A | 9/1999 | Walsh et al. | 726/23 |
| 6,122,738 A | 9/2000 | Millard | 713/187 |
| 6,405,103 B1 * | 6/2002 | Ryan et al. | 700/275 |
| 7,069,594 B1 | 6/2006 | Bolin | 726/26 |
| 2001/0054172 A1 * | 12/2001 | Tuatini | 717/1 |
| 2003/0009687 A1 | 1/2003 | Ferchau et al. | 726/22 |
| 2003/0115185 A1 * | 6/2003 | Byers | 707/3 |
| 2003/0154444 A1 * | 8/2003 | Tozawa et al. | 715/513 |
| 2003/0159063 A1 | 8/2003 | Apfelbaum et al. | 726/25 |
| 2003/0221115 A1 | 11/2003 | Itoh et al. | 713/189 |
| 2004/0002952 A1 * | 1/2004 | Lee et al. | 707/1 |
| 2004/0073870 A1 * | 4/2004 | Fuh et al. | 715/513 |
| 2004/0194016 A1 * | 9/2004 | Liggitt | 715/501.1 |
| 2005/0177543 A1 * | 8/2005 | Chen et al. | 707/1 |
| 2005/0188419 A1 | 8/2005 | Dadhia et al. | 726/1 |
| 2006/0041792 A1 | 2/2006 | Mah et al. | 714/38 |
| 2006/0155817 A1 * | 7/2006 | Desai et al. | 709/208 |

OTHER PUBLICATIONS

"MD5 File Validation", Aug. 1, 2002, http://www.cisco.com/univercd/cc/td/doc/product/software/ios122/122newft/122t/122t4/ft_md5v.pdf.
PORTUS Application Protection System Product Brief, 1994-2005 http://www.Isli.com/PORTUS_52.ProductBrief.pdf.
"Web Application Protection", Jul. 2002, http://www.iss.net/documents/whitepapers/WebAppProt.pdf.

* cited by examiner

*Primary Examiner* — Kambiz Zand
*Assistant Examiner* — Michael Guirguis
(74) *Attorney, Agent, or Firm* — Merchant & Gould P.C.

(57) ABSTRACT

Input data is validated by generating code based on the input data. A schema is generated based on the input data indicating conditions for the input file. The schema may then be customized based on a type of application to consume the input data. A validator executable code is generated based on the schema and checks the input file for compliance with the conditions determined by the schema. Results of validation may be provided to the application in yes or no form, or as number of non-compliances. In the latter case, the application may decide to accept or reject the data based on predetermined non-compliance levels.

17 Claims, 6 Drawing Sheets

GENERATING CODE TO VALIDATE INPUT DATA

BACKGROUND

File fuzzing is the process of providing an application with a lot of different and broken input. While fuzzing is mainly intended to test integrity of files and robustness of applications, it has also changed the way attackers find exploits in applications. Those searching for exploits can essentially "carpet bomb" a product with large volumes of randomly generated tampered data. Therefore, it is no longer sufficient to release a patch resolving a found issue, or even a patch that includes several fixes in the "code locality" of the original vulnerability. In fact, releasing an incomplete patch may even cause more problems for the users, as the release of a bulletin itself may bring the product to the attention of those using fuzzing for malicious reasons. Remaining vulnerabilities may sometimes be found even in a matter of minutes. The task of fixing the individual vulnerabilities in the code is often overwhelming, particularly for applications with a large legacy code base or with older in-market products still under support.

The task of protecting against attacks is also daunting not only because of the sheer numbers involved but because the problems may be widespread. While some singular issues are encountered frequently, there is a long tail of harder-to-nail-down problems. The development time estimates after an analysis of fuzzing type attacks can vary from days to years.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to validating input data by generating code based on the input data. A schema may be generated based on the input data indicating conditions for the input file. According to some embodiments, the schema may be customized based on a type of application to consume the input data. A validator executable code may then be generated based on the schema and check the input file whether the conditions are complied with or not. Results of validation may be provided to the application, which can decide whether to accept or reject the data.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, to protect an application from exploit, code may be generated automatically to block invalid data. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
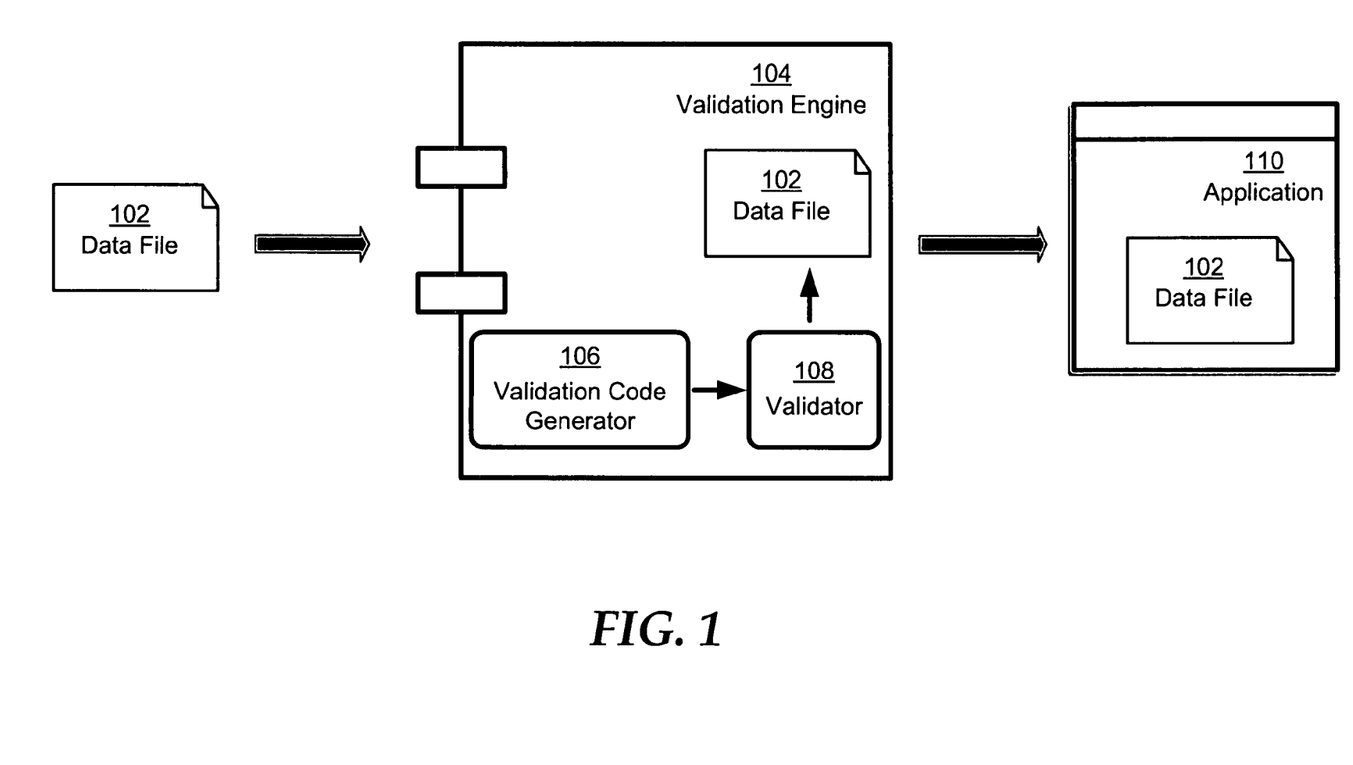
FIG. 1 illustrates a conceptual diagram of input data validation.

Referring to FIG. 1, a conceptual diagram of input data validation is illustrated. According to embodiments, a starting point from which the validation code is generated may be a description of the application input (e.g. a data file). The description may include a structure of data, expected values, restrictions imposed by data relationships, and the like within the input. Conventional approaches typically define valid input by the code that is manually written to check for it. By defining "valid" for the application with code generated with a declarative definition may be faster to develop, easier for humans to read and understand, and less risky to update.

Moreover, once this description has been created, it can be used in a multitude of ways. For example, the description may be used as input to a compiler-like "validation generator" that creates code to check input for violations of the rules defined in the description (i.e. to protect applications from attack).

The description may also be employed as a reference to a file fuzzing tool. This would allow application testers to tamper with a file's contents in specific ways known to violate the validation rules, or considered unexpected by the application (i.e. to find potential vulnerabilities before product release). Another example use of the description of input data is as a template for a file creation tool, allowing automatic creation of files with some set of data in expected bounds as defined in the description (i.e. to build a library of test files for use in product development and testing).

The conceptual diagram of FIG. 1 starts with data file 102, which is first processed by the validation engine 104. Validation engine 104 may include a validation code generator 106, which generates validator code 108 based on the description created for the data file 102. Details of how the description is created and the validator code is generate are discussed below in conjunction with following figures. Validator code 108 checks data file 102 for compliance with the description that is used by the validation code generator 106. The results of the validation process are then provided to application 110 that is configured to consume the data in data file 102.

Validation engine 104 may provide the results in a binary form such as "yes" or "no", or as number of non-compliances. Application 110 may be arranged to load the data file 102 if the results are "yes". In other embodiments, application 110 may include a predetermined level-based acceptance structure, where the data file may be accepted based on a quantity or quality of non-compliances. For example, application 110 may accept a data file with up to 10 pieces of data missing, but reject any data file where a single data piece is corrupt. Because the data file 102 is not loaded by application 110 until it has been validated, security risks (e.g. data containing malicious code) or operational risks (e.g. missing or corrupt crashing the application) due to partial loading of the data is avoided. Application 110 may successfully back out of a "file open" process upon discovery of malformed data, because the input file is not yet loaded.

Validation engine 104 may be an integrated part of application 110 or a separate program. As discussed below in conjunction with FIG. 4, validation engine 104 may also be a centralized service in a networked environment that validates input files for a plurality of applications, client devices, and the like. Data file 102 may be any type of file containing data in a formatted structure, although embodiments may enhance validation of data files with non-hierarchical structure better than those with hierarchical structure. Hierarchically structured data files, such as eXtensible Mark-up Language (XML) files inherently include their structure information. Therefore, generating a code for each data file may not be necessary for hierarchically structured data files.

In some example embodiments, the schema defining the description of the data file (used by the validation code generator 106) may be in XML format. The validator code generated based on the XML schema may be in an executable programming language such as C++. However, embodiments are not limited to these programming languages and formats. Validation of input files by generating code based on the input file may be implemented in any language, format, and structure using the principles described herein.

Figure 2:
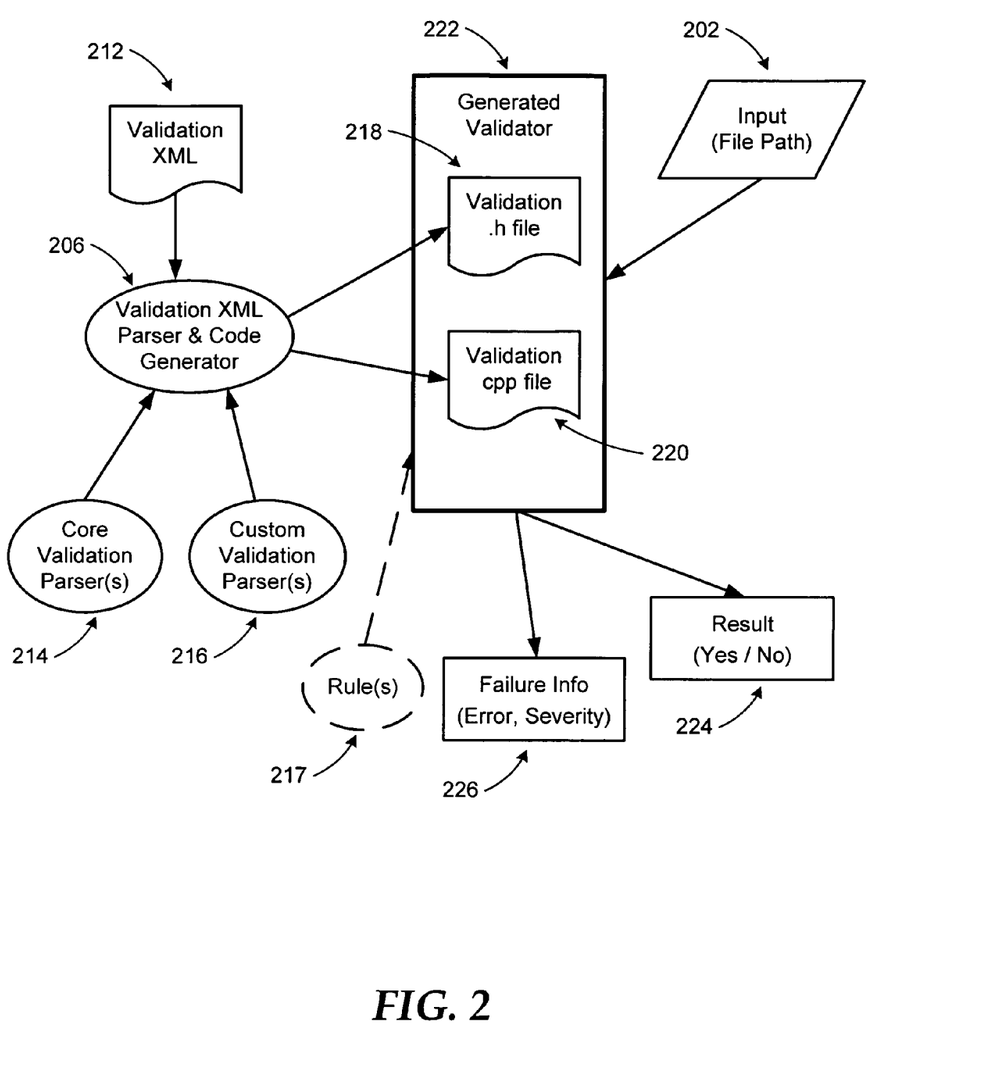
FIG. 2 illustrates a diagram of an example validation system according to embodiments.

FIG. 2 illustrates a diagram of an example validation system according to embodiments. At the core of the validation system is generated validator 222 that is generated by validation XML parser and code generator 206.

Validation XML parser and code generator 206 receives input from three possible sources. First is Validation XML file 212 describing both the format of the data file and its constraints. An example validation XML file is provided below:

```
<validationSchema>
    <customType type="CB" base="USHORT" />
    ...
    <fileStructure>
        <Docfile name="Main">
            <Stream name="Contents">
                <CB name="Size" min="0" max="40" />
                ...
            </Stream>
        </Docfile>
    </fileStructure>
</validationSchema>
```

According to some embodiments, there are two parts to the validation XML file: the optional custom type definitions (beginning with customType) and the file structure definition (beginning with fileStructure). Custom type definitions allow an application to define a type that is referenced in the subsequent file structure definition. This feature may be used for:

1) Simple aliasing: an application may find it easier to use some nomenclature common to the application rather than the usual type names. In the above example, "CB" is simply another name for an unsigned short (USHORT)

2) Simple structs: A struct comprised of known types can be defined in the customType. The struct can then be used in the file structure definition without the need to re-define the struct.

3) Complex data structures: More complex data can also be defined as a customType. Data structures that cannot be expressed as a combination of known data types may require a custom parser.

The file structure definition names each component of the file, its children in a hierarchic structure, and their constraints. In the above example, an item called "Size", which is of type "CB", is only valid for values between 0 and 40.

Another input to validation XML parser and code generator 206 may be provided by core validation parser(s) 214. Core validation parser(s) 214 may be a Dynamic Link Library (DLL) containing the instructions for parsing validation XML 212 file into validation code. In some embodiments, core validation parser may be in C# and the validation code in C++. Core validation parser may be considered the default parser. Some of the data types that may be parsed by core validation parser 214 may include: BOOL, BYTE, Docfile, DWORD, FilePointer, FixedBlob, LONG, SHORT, Storage, Stream, Struct, ULONG, USHORT, WORD, and the like.

Optionally, applications may incorporate a DLL that contains instructions for custom parsing of validation XML file 212. This module may include definitions for custom data structures used by a specific application.

Validation XML parser and code generator 206 may be implemented as a DLL that utilizes functionality from the individual parsers to generate validation code. In some embodiments, this component may also contain a number of helper functions that can be used when writing a custom validation parser to navigate validation XML file.

Generated validator 222 is the generated validation code as integrated and compiled by the application. This is the actual component that is used at the start of an application's "file open" process to determine whether a file is valid or not. Input 202 provides the data file to generated validator 222. In one embodiment, input 202 may include a path to the data file. Validation .h file 218 and validation .cpp file 220 are two files generated by the validation XML parser and code generator 206 in implementations where the validation code is in C++.

Generated validator 222 may provide two different types of results. One type is result 224 in "yes" or "no" form. This may allow simple acceptance or rejection of the data by the application. Another type of result is failure information 226. Failure information 226 provide detailed information about encountered validation failures. The information may be quantitative and/or qualitative. For example, the error report may include an error ID and a severity level for each encountered error. This way, a client application may set a predetermined acceptance level based on the number or severity of encountered errors (or both). The detailed information may also be used by some applications for determining a course of action for encountered errors such as repairing the malformed data, ignoring the error, and the like.

According to some embodiments, application programmers may be enabled to write a "rule" (217) in addition to describing constraints on the file using the types defined in the parsers. The rule 217 (or rules) may be a section of code within the file description that is placed directly into the code output. In one implementation the file description may be XML and the code output $C^{++}$ as described above. The code evaluates to a result, like a microcosm of the overall system, and like any other rule if the input data is in violation, the overall result reflects the violation.

Expressions may be used to allow custom rules to appear directly in the file description. These expressions may range from simple checks (e.g. "{.}→GetValue=4" would check that the value of that particular item is 4) to more complex checks using navigation (e.g. "{ . . . \cb}.GetValue( )={ . . . \cb2}.GetValue( )" would make sure that cb and cb2 in the parent object are equal). Even arbitrary code injection may be enabled (e.g. "FGoCheckSomethingImportant( )" would result in just injecting that exact $C^{++}$ code, which can be a call to a method that can perform arbitrary actions).

The ability to directly inject rule 217 into the code provides flexibility in defining constraints, and may be implemented as an optional process along with the use of custom parsers.

It should be noted that while FIG. 1 and FIG. 2 refer to specific languages such as XML and $C^{++}$, embodiments are not limited to these languages and can be implemented in any programming language.

Furthermore, embodiments are not limited to the illustrated examples in FIG. 1 and FIG. 2. Other architectures may be implemented using the principles described herein for a validation system generating code based on the input, such as using partially pre-defined code.

Figure 3:
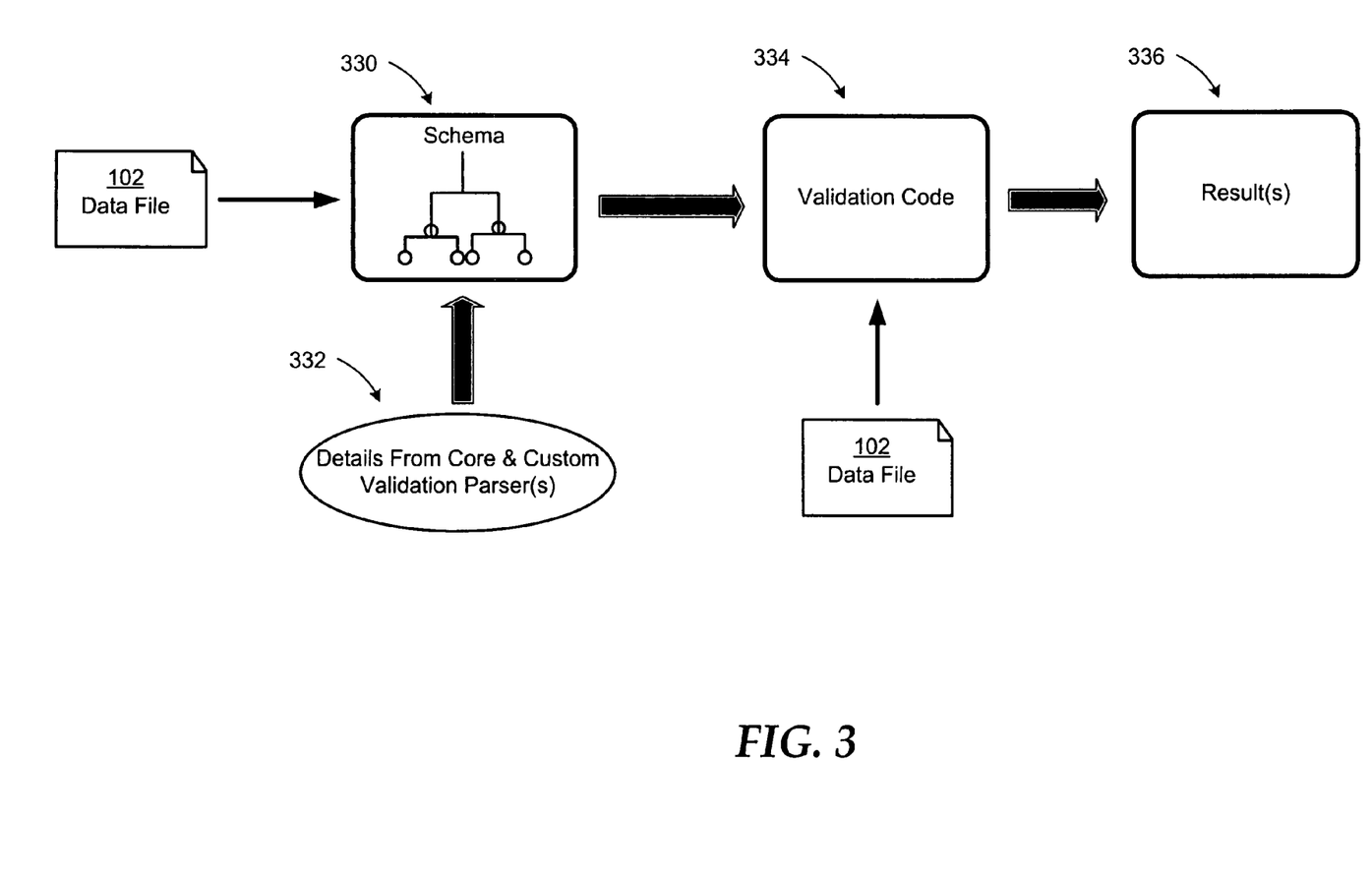
FIG. 3 is a conceptual diagram illustrating main phases of validation by generated code according to embodiments.

FIG. 3 is a conceptual diagram illustrating main phases of validation by generated code according to embodiments. The validation process begins with the data file (102) that is about to be consumed by an application and ends with results of the validation being provided to the application.

Schema 330 is a structured file (e.g. XML) that includes descriptions of a structure of the data, expected values, or restrictions imposed by data relationships within the data file 102. Schema 330 is parsed and executable validation code 334 generated from it to check the data file. In generating the validation code 334, additional details and definitions may be provided from core and/or custom validation parsers 332.

Once generated validation code 334 checks the data file 102 rendering results 336 of compliance with the definitions in the original schema 330. In one example implementation, schema 330 may include hierarchically structured objects corresponding to pieces of data within the data file 102. The structure of the objects may be based on the relationship of the data pieces in the original file (e.g. a binary file). Each of the objects that make up the hierarchy may have the ability to navigate through the hierarchy to other objects. Using the ability to navigate, validation conditions may be imposed and checked with the objects, which may not be easy to accomplish on the original data format.

Embodiments are not limited to the example operations discussed above. Many other types of operations may be performed in a validation system according to embodiments using the principles described herein.

Figure 4:
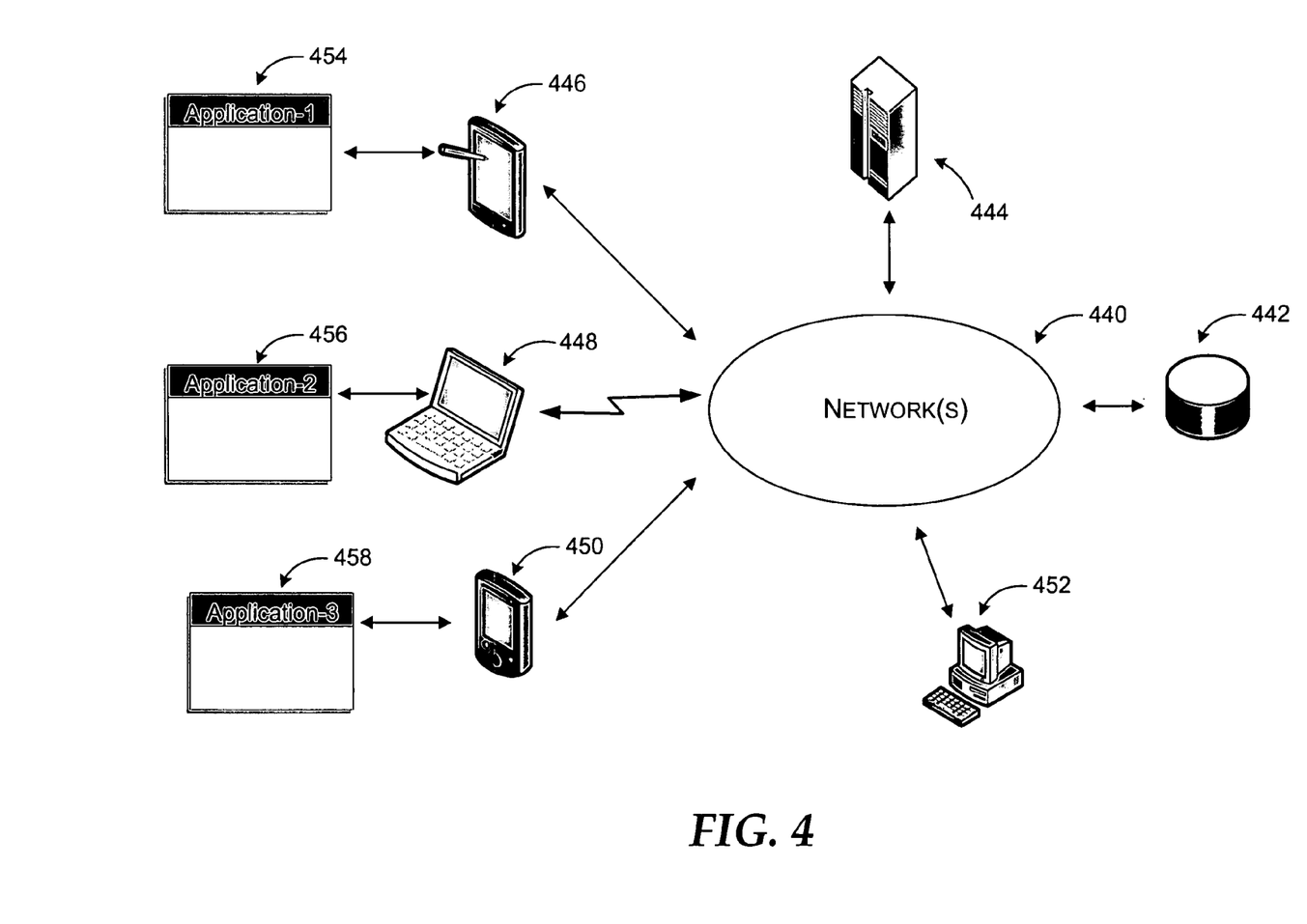
FIG. 4 illustrates use of input data validation in a networked system.
Figure 5:
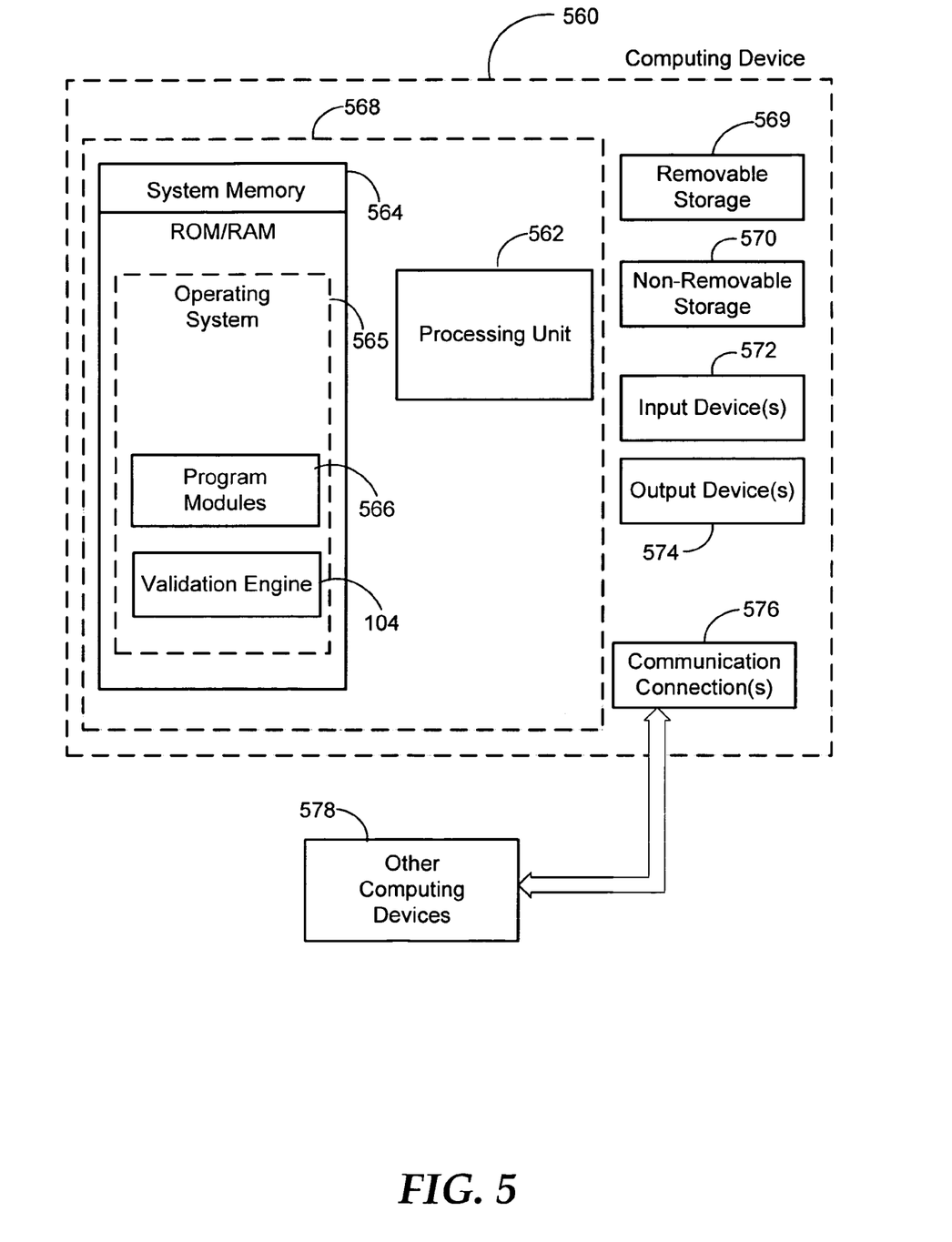
FIG. 5 is a block diagram of an example computing operating environment, where embodiments may be implemented.

Referring now to the following figures, aspects and exemplary operating environments will be described. FIG. 4, FIG. 5, and the associated discussion are intended to provide a brief, general description of a suitable computing environment in which embodiments may be implemented.

FIG. 4 illustrates use of input data validation in a networked system. The system may comprise any topology of servers, clients, Internet service providers, and communication media. Also, the system may have a static or dynamic topology. The term "client" may refer to a client application or a client device employed by a user to perform operations associated with accessing a networked system. While a networked input data validation system may include many more components, relevant ones are discussed in conjunction with this figure.

Applications with poor input validation can be compromised by malicious input from an attacker. Validating user input is one of the first lines of defense for local and networked applications. Some of the protection mechanisms include: ensuring that a client application validates all input before processing or passing it to downstream resources and assemblies in a networked environment, performing thorough validation of user input data if it is being passed to an unmanaged Application Programming Interface (API). The latter measure may also help prevent buffer overflows.

Some networks incorporate a redundant system, where client validated data is validated again on network servers (e.g. web servers) to prevent malicious input that bypasses client-side validation. A validation engine according to embodiments may be implemented in a centralized fashion in a networked environment such as that described in FIG. 4 reducing development efforts and helping future maintenance.

Applications (e.g. 454, 456, and 458) may be any application configured to consume external data from a file and may be executed on individual computing devices such as computing devices 446, 448, 450, and 452. On the other hand, a networked service may be provided to various applications on client devices where a server centrally manages virtualization and subsequent operations. For example, server 444 may include programs that communicate with individual applications on client devices, such as application 1 (454) on computing device 446, application 2 (456) on computing device 448, and the like, over network(s) 440. When one of the applications is about to consume a data file, a validation engine on server 444 may execute the validation process described above first creating code based on a schema describing the data structure, etc. for the file, then executing the code to check the data file for compliance with the definitions. The schema may include a virtual hierarchic tree of navigable and actionable objects based on discrete data pieces of the file. Using a schema based method to generate the executable code for validating the data enables human readability, i.e. a developer can easily determine from the code action sequences generated for validating the data.

Server 444 may provide results of the validation to individual applications and let them decide whether they continue with loading the data file or not. In a stricter security environment, server 444 may reject the data based on criteria stored on the server and indicate to the application that it may not load the data file. In yet other embodiments, the individual applications may include the validation engine as an integrated or separate module on their respective client devices.

In executing a centrally managed validation system, server 444 may also communicate with database 442 over network(s) 440 for retrieving or storing data. Database 442 may include one or more data stores, such as SQL servers, databases, non multi-dimensional data sources, file compilations, data cubes, and the like. Server 444 may include additional programs with various functionalities that can utilize the validation results. Such programs may include file testing programs, file repair programs, debugging programs, security applications, and the like. Some or all of these programs may also reside in the individual computing devices and be executed locally. Once the validation operations are successfully completed, the original application may consume the data from the file.

Network(s) 440 may include a secure network such as an enterprise network, an unsecure network such as a wireless open network, or the Internet. Network(s) 440 provide communication between the nodes described herein. By way of example, and not limitation, network(s) 440 may include wired media such as a wired network or direct-wired connection, and wireless media such as acoustic, RF, infrared and other wireless media.

Many other configurations of computing devices, applications, data sources, data distribution and analysis systems may be employed to implement an input data validation system. Furthermore, the networked environments discussed in FIG. 4 are for illustration purposes only. Embodiments are not limited to the example applications, modules, or processes. A networked environment for implementing input data validation by generating code based on the input may be provided in many other ways using the principles described herein.

With reference to FIG. 5, a block diagram of an example computing operating environment is illustrated, such as computing device 560. In a basic configuration, the computing device 560 typically includes at least one processing unit 562 and system memory 564. Computing device 560 may include a plurality of processing units that cooperate in executing programs. Depending on the exact configuration and type of computing device, the system memory 564 may be volatile (such as RAM), non-volatile (such as ROM, flash memory, etc.) or some combination of the two. System memory 564 typically includes an operating system 565 suitable for controlling the operation of a networked personal computer, such as the WINDOWS® operating systems from MICROSOFT CORPORATION of Redmond, Wash. The system memory 564 may also include one or more software applications such as program modules 566 and validation engine 104.

As described previously in more detail, validation engine 104 provides the ability to validate input data before it is loaded to an application (e.g. a program module) by generating code based on the input. Validation engine 104, and any other related engines may be an integrated part of an application or operate remotely and communicate with the application and with other applications running on computing device 560 or on other devices. Furthermore, validation engine 104 may be executed in an operating system other than operating system 565. This basic configuration is illustrated in FIG. 5 by those components within dashed line 568.

The computing device 560 may have additional features or functionality. For example, the computing device 560 may also include additional data storage devices (removable and/or non-removable) such as, for example, magnetic disks, optical disks, or tape. Such additional storage is illustrated in FIG. 5 by removable storage 569 and non-removable storage 570. Computer storage media may include volatile and non-volatile, removable and non-removable media implemented in any method or technology for storage of information, such as computer readable instructions, data structures, program modules, or other data. System memory 564, removable storage 569 and non-removable storage 570 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 560. Any such computer storage media may be part of device 560. Computing device 560 may also have input device(s) 572 such as keyboard, mouse, pen, voice input device, touch input device, etc. Output device(s) 574 such as a display, speakers, printer, etc. may also be included. These devices are well known in the art and need not be discussed at length here.

The computing device 560 may also contain communication connections 576 that allow the device to communicate with other computing devices 578, such as over a network in a distributed computing environment, for example, an intranet or the Internet. Communication connection 576 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
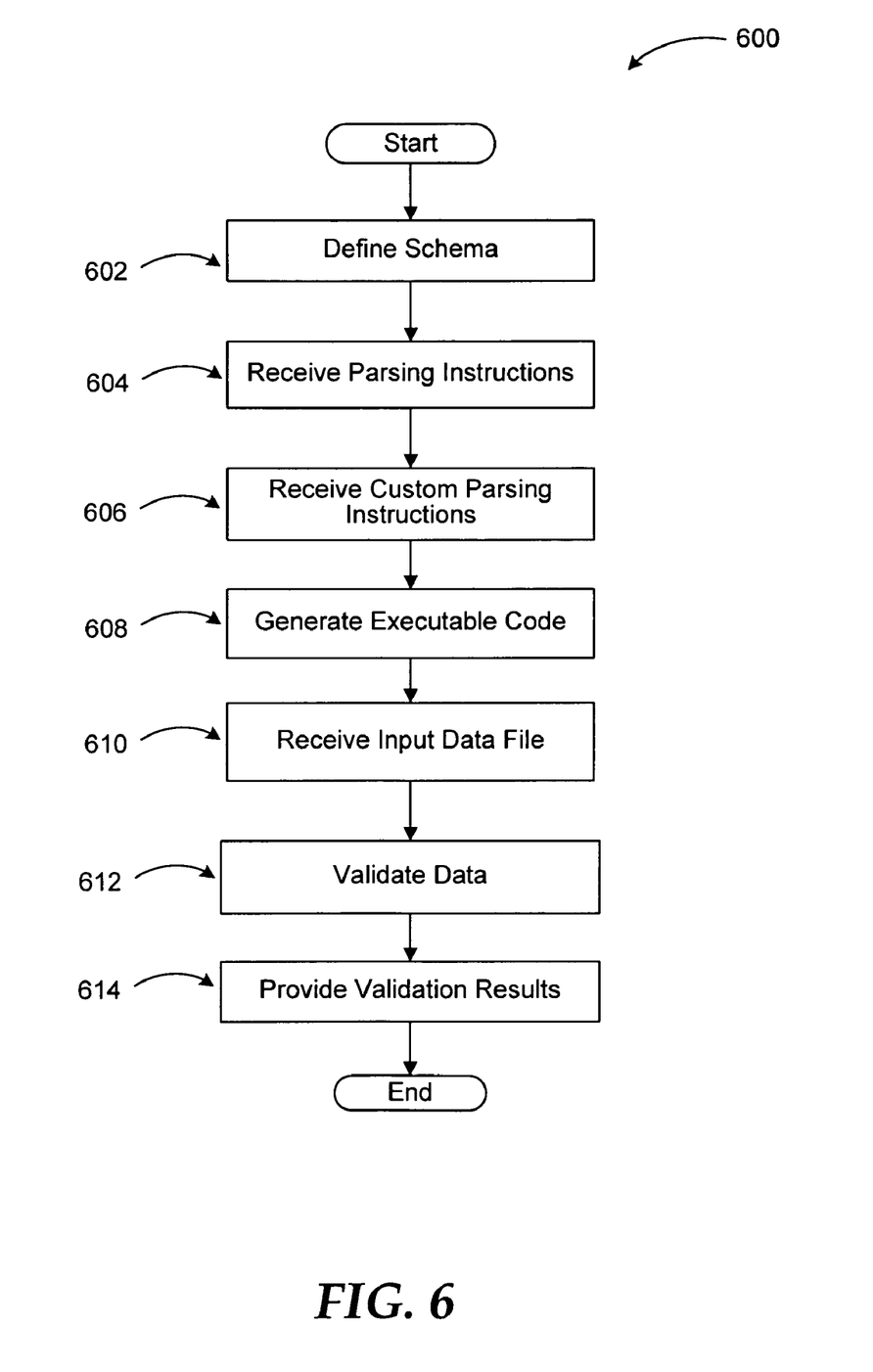
FIG. 6 illustrates a logic flow diagram for a process of validating input data by generating code based on the file description.

FIG. 6 illustrates a logic flow diagram for a process of validating input data by generating code based on the file description. Process 600 may be implemented in validation engine, which may be part of an application or a separate module.

Process 600 begins with operation 602, where a schema based on descriptions of a structure of the data, expected values, or restrictions imposed by data relationships within an input data file is defined. The schema may be a structured document such as an XML file. Processing advances from operation 602 to operation 604.

At operation 604, instructions for parsing the schema into an executable validation code are received from a core parser module that includes file structure definition names, etc. for each member of the schema. Processing proceeds from operation 604 to operation 606.

At optional operation 606, custom parsing instructions are received for custom data types associated with specific applications. Processing moves from optional operation 606 to operation 608.

At operation 608, a validation code generator module generates executable validation code based on the schema and the received parsing instructions. Processing advances from operation 608 to operation 610.

At operation 610, the input data is received from the input file. Because the data is not loaded (even partially) to the application until the validation process is completed, security or "file open" process risks are avoided. Processing advances from operation 610 to operation 612.

At operation 612, the input data is validated using the executable validation code. Validation failures may be recorded quantitatively as well as qualitatively, such as number of errors and type and/or severity level of each error. Processing advances from operation 612 to operation 614.

At operation 614, results of the validation are provided to the application about to consume the data. The results may be a simple yes or no based on a predetermined criterion (e.g. single error results in rejection) or a detailed error report for the application to interpret and decide whether it wants to accept the data or reject it. After operation 614, processing moves to a calling process for further actions.

The operations included in process 600 are for illustration purposes. Providing input data validation using code generated based on input may be implemented by similar processes with fewer or additional steps, as well as in different order of operations using the principles described herein. For example, once the validation is complete, the results may be used by a repair engine to decide and repair portions of the malformed data.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for protecting an application against malformed input data, the method comprising:
defining a schema for a well-formed data file containing input data;
providing input to a parser module for parsing the schema, the input to the parser module originating from two or more sources, one of the sources including instructions for custom parsing of the data file into validation code;
generate executable code based on the schema;
validating the input data using the executable code; and
providing validation results to the application,
wherein the validation results include a quantitative report and a qualitative report of validation errors, the quantitative report including a total number of validation errors, the qualitative report including a severity level for each validation error, and wherein the input data is accepted when the severity level of each validation error does not exceed a first predetermined acceptance level and when the number of validation errors does not exceed a second predetermined acceptance level.

2. The method of claim 1, wherein the schema includes descriptions for at least one from a set of: a structure of the input data, an expected value for the input data, and a restriction imposed by a relationship among the input data.

3. The method of claim 2, wherein the descriptions are included in the schema as a hierarchic structure of objects corresponding to data units within the data file.

4. The method of claim 1, further comprising:
retrieving instructions from the parser module for generating the executable code based on the schema.

5. The method of claim 4, wherein the parser module includes a set of instructions for generic data types and another set of instructions for custom data types.

6. The method of claim 1, wherein the validation results include one of acceptance and rejection of the input data.

7. The method of claim 1, further comprising:
receiving a rule for further validation of the input data;
injecting a code segment based on the received rule directly into the executable code.

8. The method of claim 7, wherein the rule includes one or more expressions that include at least one from a set of: a value validation, a validation through navigation, and a call function for a predefined action.

9. The method of claim 1, further comprising:
defining the schema based on at least one of: a format of the input data in the data file and a placement of the input data in the data file.

10. A system for protecting an application against malformed input data, comprising:
a system memory;
a processing unit that, when executing instructions stored on the system memory, creates a validation engine configured to:
execute a validation code generator module that is arranged to generate executable validation code based on a schema defining a well-formed data file containing input data and instructions from at least one parser module, the at least one parser module receiving inputs from two or more sources, one of the sources including instructions for custom parsing of the data file into validation code;
receive the input data;
execute the validation code to validate the input data; and
provide validation results to the application,
wherein the validation results include a quantitative report and a qualitative report of validation errors, the quantitative report including a total number of validation errors and the qualitative report including a severity level for each validation error.

11. The system of claim 10, wherein the validation engine is one of: an integrated part of the application, a separate program module, and a centralized network service.

12. The system of claim 10, wherein the schema is in eXtensible Mark-up Language (XML) format and the validation code is in $C^{++}$ format.

13. The system of claim 10, further comprising a repair engine configured to repair a malformed portion of the data based on at least one of: a type and a number of validation errors.

14. The system of claim 10, wherein the at least one parser module includes a core parser module configured to provide instructions for parsing the schema into the validation code and a custom parser module configured to provide file structure definitions for each component of the schema associated with a specific application, and wherein the core parser module, the custom parser module, and the validation code generator module are Dynamic Link Library (DLL) modules.

15. The system of claim 10, wherein the validation code generator is further configured to provide at least one helper function for writing a custom parser module to navigate the schema.

16. A computer-readable storage medium having computer executable instructions for validating data in an input file, wherein the computer-readable storage medium does not consist of a propagated signal, the instructions comprising:
receiving a schema defining a well-formed data file containing input data;
receiving instructions to a validation parser module for custom parsing of the input file into validation code;
receiving instructions from the validation parser module for parsing the schema into executable validation code, the received instructions including a set of instructions for generic data types and another set of instructions for custom data types;
generating executable validation code using the received instructions;
validating the input data by executing the executable validation code on the input file;
providing validation results to the application, the validation results include a quantitative report and a qualitative report of validation errors, the quantitative report including a total number of validation errors and the qualitative report including a severity level for each validation error;
evaluating the validation results;
when the severity level of each validation error does not exceed a first predetermined acceptance level and when the number of validation errors does not exceed a second predetermined acceptance level, accepting the input data; and
when the severity level of any validation error exceeds the first predetermined acceptance level or when the number of validation errors exceeds the second predetermined acceptance level, repairing a malformed portion of the input data.

17. The computer-readable medium of claim 16, wherein an input to the validation code includes a path definition of the input file.

* * * * *